March 18, 1941. N. LEVINSON 2,235,029
SOUND FILM EDITING DEVICE
Original Filed March 23, 1937
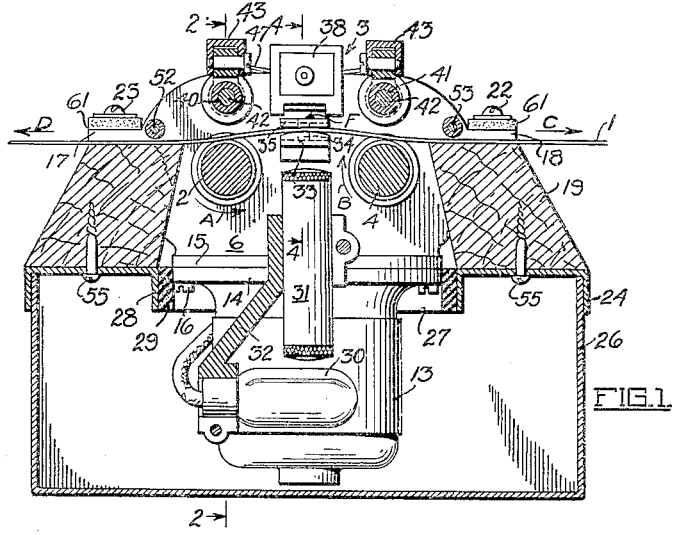
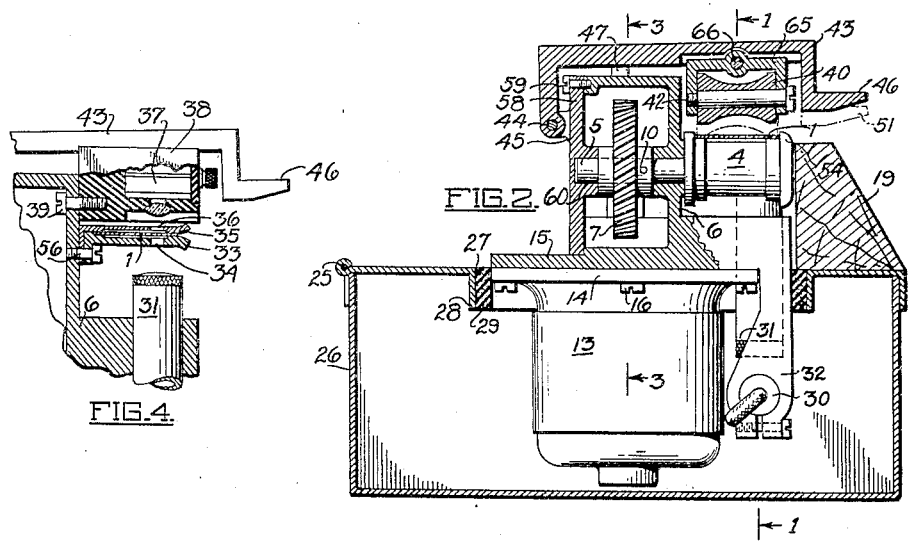
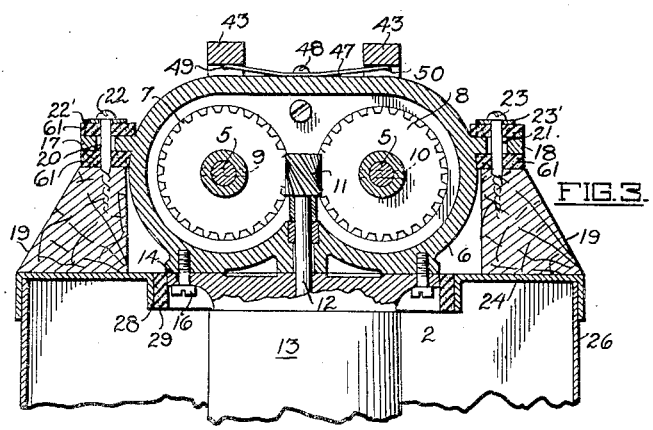
INVENTOR
NATHAN LEVINSON
ATTORNEY Patented Mar. 18, 1941

2,235,029

UNITED STATES PATENT OFFICE 2,235,029

SOUND FILM EDITING DEVICE

Nathan Levinson, Hollywood, Calif., assignor to Warner Bros. Pictures, Inc., New York, N. Y., a corporation of Delaware Application March 23, 1937, Serial No. 132,599
Renewed February 20, 1939

13 Claims. (Cl. 179—100.3)

This invention relates to sound reproducing apparatus and particularly to apparatus for editing a film having a sound record thereon such as is used in the reproduction of talking motion pictures.

In the process of editing motion picture film having an accompanying sound record, it is necessary to determine at times the exact portion of the record on which certain words or sounds occur. For example, it may be desired to add or cut out certain undesirable words of a dialogue. Again it may be required to add various sound effects such as the ringing of a bell or blowing of a whistle immediately after or before a certain spoken word. Many times this is done after the original sound record is recorded and it is thus necessary to find and mark upon the film the exact place at which the sound effect is to be added. Also, in the case where the sound and pictures are recorded on separate films in separate apparatuses it may be possible that the clutch on the camera motor may slip or for some other reason the two films may become unsynchronized thus causing the sound film to be of a different length than the picture film. When this occurs, much time, film and expense may be saved if the retaking of the particular scene may be avoided by adding or omitting various pauses between words and sentences or even unimportant words or lines may be added or omitted to the sound record to bring both films to the same length.

Heretofore, it has been the common practice in determining the portions of a sound film wherein a certain desired sound or word is contained to run the film through a miniature projector, having a sound reproducing apparatus attached thereto. This has several disadvantages, one of which is that due to the relatively high speed at which the film is run, i. e., 90 feet per minute, considerable time is taken to stop the machine after the desired word or sound is heard, thus making it very difficult to determine the exact point at which the sound is represented on the film. One method of overcoming this defect has been to hold a pencil or crayon over the film as it passes the sound translating point in the projector. When a desired sound or a defect in the sound is noted, the operator pushes the crayon against the film thus marking the approximate point of such sound. Obviously, this method is not accurate due to the time lag of the human element.

Running the projector at a slower speed than 90 feet per min. causes the sound to be unintelligible and distorted and thus unfit for examination purposes.

Also, if the operator overshoots the mark or wishes to review a portion of film which has already gone through the projector, he has to either re-thread the film or stop the machine and operate it in reverse.

The present invention provides means for determining the exact portion of a film, having a sound record thereon, upon which a certain sound or word is recorded and has for an object to start and/or stop a sound film substantially instantaneously.

This is accomplished by providing film engageable rollers which are continuously driven at a constant speed. Movement of the film is caused by pressing it against the surface of the rotating rollers. This may be done by providing idler rollers which are normally out of contact with the film but which when pressed hold the film against the surface of the rotating rollers. Due to the negligible amount of inertia in the film and also to the constantly rotating rollers, the film may be started or stopped almost instantaneously.

Another object of the invention is to move the film in either a forward or backward direction with respect to its length.

This is accomplished by providing a pair of oppositely driven film engageable rollers. Selective engagement of the film with either one or the other of the rollers causes a movement in either direction.

Other objects of the invention are to facilitate threading and to provide a simple and inexpensive sound reproducing device.

More particularly describing the invention, reference may be had to the accompanying drawing in which:

Fig. 1 is a sectional elevational view of a sound reproducing device embodying the present invention.

Fig. 2 is a transverse sectional view taken along the line 2—2 of Fig. 1.

Fig. 3 is a sectional view, partly broken away, of the roller driving mechanism and is taken along the line 3—3 of Fig. 2.

Fig. 4 is a sectional view of part of the optical system and is taken along the line 4—4 of Fig. 1.

Referring now to Fig. 1, a film 1 is passed in a horizontal direction over a constantly rotating roller 2, and normally out of frictional contact therewith. The film then passes through a sound translating device generally indicated at 3, thence over a second rotating roller 4 which is also normally out of frictional contact with the film. Roller 4 is driven in an opposite direction from that of roller 2. The rollers 2 and 4 have spindles 5 projecting at the rear ends thereof (Fig. 2) which are journaled within a gear housing 6. Each of the spindles 5 has a helical driven gear as at 7 and 8 (Fig. 3) secured thereto by pins 9 and 10. Each of the gears 7 and 8 is preferably of fiber or similar sound reducing material. A cover plate 58 is secured to the rear portion of the housing 6 by screws 59. Bearing portions 60 are provided in the plate 58 to receive the ends of the shafts 5. A smaller helical driving gear 11 is interposed between the two gears 7 and 8 so that it meshes with the teeth of the same and is driven through a shaft 12 by means of a suitable electric motor 13. It is to be understood that the gears 7, 8 and 11 have their teeth cut in the same helical direction. That is, the helices of the gears 7, 8 and 11 are either all right handed or all left handed so as to permit opposite rotation of the two gears 7 and 8.

The motor 13 is made to rotate so as to drive the rollers 2 and 4 in the direction of the arrows A and B, respectively (Fig. 1). The motor 13 has an enlarged circular base 14 which is adapted to be secured against a similar base 15 on the lower portion of the housing 6 by means of screws 16. Other methods of driving the rollers 2 and 4 may be utilized. For example, spur gears may be used instead of helical gears, thus placing the motor and driving gear in a plane parallel to the axis of the rollers 2 and 4. Again, the gears 7 and 8 may be made large enough to mesh with each other, thus allowing the motor to be directly attached to one of the roller shafts 5 or to be connected by a gear meshing with one of the gears 7 or 8.

Ears 17 and 18 are provided on either side of the housing 6 (Fig. 3), to support the housing 6 and its accompanying parts upon a wooden table piece 19. Insulation material 61 such as soft rubber or felt is provided on either side of the ears 17 and 18 to insulate the housing 6 from its support. Ears 17 and 18 have enlarged bores 20 and 21 therein through which are passed screws such as at 22 and 23, having washers 22' and 23' adjacent their heads. The table piece 19 is secured by screws 55 upon a cover 24 which is hinged as at 25 (Fig. 2) to a base member 26. The cover 24 has an opening 27 in the central portion thereof to receive the motor 13 and part of the translating device 3. The cover 24 is defined by a depending flange 28 which is provided with a padding 29 of insulating material to assist in dampening any vibrations or sounds caused thereby.

Referring now to Figs. 1 and 4, the sound translating means 3 comprises an exciter lamp 30 and a lens barrel 31 which is provided to focus a beam of light from the lamp 30 upon the moving film 1 at a point F which is hereafter termed the sound translation point. Both the lens barrel 31 and the lamp 30 are adjustably secured within a bracket 32 depending from the housing 6. The film, as it passes the sound translating point F, is guided by means of an aperture plate 33 having an aperture 34 therein. A pressure pad 35 formed of a springy material keeps the film in engagement with the aperture plate 33 and prevents fluttering at this point. Both the aperture plate 33 and the pad 35 are secured to the forward wall of the housing 6 as by screws 56 (Fig. 4). An aperture 36 provided in the pressure pad 35 allows light passing through the sound record of film 1 to be received by a light sensitive cell 37 provided in a cell housing 38. The housing 38 is secured to the housing 6 as by bolts 39. Suitable conductors (not shown) connect the light sensitive cell 37 to a suitable amplifier system (not shown) to thus reproduce the sound recorded upon the film 1 as it moves past the sound translating point F.

Referring now to Figs. 1 and 2, a pair of idler or pad rollers 40 and 41 is provided above the rollers 2 and 4. Each of the rollers 40 and 41 is journaled upon a bearing stud 42 which is secured at either end to an equalizing yoke 65. Yoke 65 is pivotally supported at the center thereof by means of a stud 66 secured to a lever 43. Each lever 43 has one end pivoted by means of a pin 44 to a boss 45 provided on the side of the cover plate 58. The other end of the lever 43 has a finger piece 46 thereon which is adapted to be pressed by the fingers of an operator so as to engage the film 1 with the roller 2 or 4 and thus produce motion of the film in the direction desired. A leaf spring 47 is secured to the upper surface of the housing 6 by means of a screw 48 (Fig. 3) and its ends 49 and 50 resiliently hold the levers 43 in the position shown in the full lines of Fig. 2 and thus keep the idler rollers 40 and 41 in a normally disengaged position. When either of the finger pieces 46 is depressed into the position shown by the dotted lines 51 of Fig. 2, the roller 40 or 41 presses the film 1 against the surface of one of the film driving rollers 2 or 4, thus providing a frictional drive for the film. If the roller 41 is pressed so as to engage the film with the roller 4, the film will travel in the direction of arrow C, while if the roller 40 is pressed into engagement with the film, the film will travel in the direction of arrow D. A pair of guide rollers 52 and 53 is placed adjacent the rollers 2 and 4 to keep the film 1 in position and to assist in preventing flutter. In order to facilitate threading of the film, each of the rollers 2 and 4 is rounded at its outer end as at 54 (Fig. 2). It will be noted on reference to Fig. 1 that the film gate, comprising aperture plate 33 and pressure pad 35, is above the level of the top surface of the table piece 19 and also above the upper surfaces of the rollers 2 and 4. Thus the film 1 will be normally held out of contact with the rollers 2 and 4 until it is engaged by either of the pad rollers 40 and 41.

In operation, the film is moved in a forward direction by depressing the correct idler roller until the particular desired sound is found or until a defect in the sound or dialogue is noted. If the operator overshoots the mark, or if he desires to listen to the sound again, he depresses the correct lever which causes the film to go backwards. When the point on the film corresponding to a certain sound desired is found, the film is drawn over to one side upon the surface of the table piece 19 and there marked or cut.

Film supply and take-up reels may be positioned on either side of the editing machine. When a long strip of film is to be reproduced, the supply reel may be given a start by hand and then the take-up reel may be cranked by hand while the proper pad roller is held depressed. When a shorter strip of film or a short portion of a long strip is to be edited, the film is drawn off the reels and permitted to remain loose on the table or in baskets on either side of the machine so that it can be started or stopped in its advancement in either direction almost instantaneously.

Having thus described the invention, what is claimed as new and desired to be secured by Letters Patent, is:

1. A sound reproducing device comprising the combination of, a pair of horizontally disposed film engaging members, driven helical gears operatively connected to said members, a vertically disposed helical driving gear between said driven gears and adapted to drive said driven gears in oppositely rotating directions, means for rotating said driving gear, means for selectively engaging a sound record carrier with either of said members, and means for translating said sound record.

2. A sound reproducing device in accordance with claim 1 wherein said last mentioned means are intermediate said film engaging members.

3. In a sound reproducing device, the combination of a pair of rotatable film driving members, means for rotating said members in opposite directions, means for guiding a film having a sound record thereon over said members, a pad roller in juxtaposition with each of said film engaging members, said rollers being normally out of engagement with said members, means for selectively engaging one of said pad rollers with the film whereby said film is engaged by the respective film engaging member, and means intermediate said film engaging members for translating said sound record.

4. In a sound reproducing device the combination of a source of light, means for focusing said light upon a film having a sound record thereon, a pair of oppositely rotating rollers on either side of said focusing device, pad rollers movable toward said rotating rollers to press said film into engagement with said rotating rollers, and means for translating said sound record.

5. In a sound reproducing device the combination of a source of light, means for focusing said light upon a film having a sound record thereon, a pair of film driving rollers on either side of said focusing means, means for driving said rollers in opposite directions, pad rollers in juxtaposition with said oppositely rotatable rollers and normally out of engagement therewith, means for selectively moving either of said pad rollers toward its juxtaposed film driving roller whereby said film is pressed into engagement with the respective film driving roller, and means intermediate said members for translating said sound record.

6. In a sound reproducing device having a film gate, means for guiding a film having a sound record thereon through said gate, comprising a pair of rollers on either side of said gate, means for rotating said rollers in opposite directions, means for supporting said film normally out of engagement with said driven rollers, a pad roller in juxtaposition with each of said driven rollers, and means for selectively engaging either of said pad rollers with its respectively driven roller whereby said film may be selectively driven in opposite directions.

7. A sound reproducing device comprising the combination of, a vertically disposed motor having an upwardly extending shaft, a helical drive gear on said shaft, helical gears on opposite sides of said drive gear and meshing therewith, said drive gear being adapted to drive said gears in opposite directions, film driving rollers operatively connected to said gears, a sound gate intermediate said film driving rollers, means for guiding a film having a sound record thereon through said gate and normally out of contact with said film driving rollers, a pad roller in juxtaposition with each of said film driving rollers, means for selectively engaging each of said pad rollers with said film whereby said film is engaged by the respective film driving rollers, a source of light on one side of said film gate, and photo-electric means on the opposite side of said gate for translating said light as modulated by said sound record into electrical impulses.

8. In a sound reproducing device adapted to intermittently and rapidly start and stop a film sound record, the combination of a film having a sound record thereon, a roller over which said film is adapted to pass, means for driving said roller at a substantially constant speed, a movable roller mounted above and adjacent to but normally separated from said first-mentioned roller and adapted to be manually moved in contact with said film to press said film into engagement with said first-mentioned driven roller for substantially instantaneously advancing said film through said reproducing device at reproducing speed, movement of said roller away from said film stopping said film substantially instantaneously, and means adjacent said rollers for translating said sound record.

9. In a sound reproducing device adapted to intermittently and rapidly start and stop a film sound record, a film having a sound record thereon, a light source, means for projecting light from said source upon the sound record on said film, means for translating the light emerging from said sound record into corresponding electrical vibrations, a pair of rollers, means for positively driving one of said rollers, said rollers having their axes normally at an angle to one another, and means for manually moving the other of said rollers toward said driven roller, said film being pressed between said rollers when the axes of said rollers are substantially parallel and brought up to reproducing speed substantially instantaneously and substantially instantaneously stopped when said rollers release said film.

10. In a device for intermittently and rapidly accelerating and decelerating a film strip, the combination of a fixed rotatable roller over which said film strip is adapted to pass, means for positively driving said roller at a substantially uniform speed, a second roller mounted at an angle adjacent said first roller and tiltable toward and away from said fixed roller for movement and non-movement of said film strip, and means for tilting said movable roller against said film for pressing said film against said rotatable roller, said film being accelerated at substantially the peripheral speed of said driven roller when said rollers are engaged and substantially instantaneously stopped when said movable roller is released.

11. In a device for accelerating a film strip substantially instantaneously in either direction, the combination of a pair of fixed rollers, means for positively driving each of said rollers in a direction opposite to the other, a second pair of rollers independently movable with respect to one another, one of which is mounted adjacent each of said driven rollers, said film strip being adapted to pass between said fixed rollers and said movable rollers, and means for moving said movable rollers independently of each other to press said film into engagement with respective rotating rollers for accelerating said film in the direction of rotation of the respective roller engaged substantially at the peripheral speed of said driven roller.

12. In a device for periodically advancing a film strip, the combination of means for producing a light path, a pair of rollers normally separated but having relative movement into and out of engagement, said film strip being disposed between said rollers, means for driving one of said rollers, means for manually moving at desired intervals the other of said rollers toward said driven roller for causing substantially instantaneous advancement of said film strip by said driven roller, and means for moving said other of said rollers away from said driven roller when said last-mentioned means is released for causing substantially instantaneous stoppage of said film strip.

13. In a device for periodically advancing a film strip, the combination of means for producing a light path, a pair of rollers having relative movement into and out of engagement, said film strip being disposed between said rollers whereby said film strip is advanced through said light path, means for driving one of said rollers, means for selectively moving the other of said rollers toward and away from said driven roller for causing advancement and non-advancement of said film strip by said driven roller, and a second pair of rollers on the other side of said light path from said first pair of rollers, said second driven roller being driven in a direction opposite to the direction of said first driven roller.

NATHAN LEVINSON.